(12) United States Patent
Sandy

(10) Patent No.: US 8,262,042 B2
(45) Date of Patent: Sep. 11, 2012

(54) RETAINING SPLIT RING WITH CLAMP

(75) Inventor: Dale A. Sandy, Springfield, MO (US)

(73) Assignee: L.J. Star Incorporated, Twinsburg, OH (US)

( * ) Notice: Subject to any disclaimer, the term of this patent is extended or adjusted under 35 U.S.C. 154(b) by 580 days.

(21) Appl. No.: 11/818,038

(22) Filed: Jun. 13, 2007

(65) Prior Publication Data
US 2008/0001053 A1    Jan. 3, 2008

Related U.S. Application Data

(60) Provisional application No. 60/813,294, filed on Jun. 13, 2006.

(51) Int. Cl.
| | |
|---|---|
| *A47K 1/08* | (2006.01) |
| *A47G 1/10* | (2006.01) |
| *A47B 96/06* | (2006.01) |
| *E04G 3/00* | (2006.01) |
| *E04G 5/06* | (2006.01) |
| *F16B 1/00* | (2006.01) |
| *G09F 7/18* | (2006.01) |
| *F16L 23/00* | (2006.01) |
| *F16L 35/00* | (2006.01) |

(52) U.S. Cl. .................. 248/230.5; 248/312; 248/312.1; 248/313; 248/316.6; 248/230.6; 248/231.71; 248/231.61

(58) Field of Classification Search .............. 248/230.5, 248/544, 312, 312.1, 313, 316.6, 230.6, 231.61, 248/231.71; 285/364, 93; 220/377, 320
See application file for complete search history.

(56) References Cited

U.S. PATENT DOCUMENTS

| | | | | |
|---|---|---|---|---|
| 495,775 | A | | 4/1893 | Bonnamy |
| 922,508 | A | * | 5/1909 | Puffer ............................ 220/377 |
| 2,091,877 | A | * | 8/1937 | O'Nell ............................ 220/265 |
| 3,141,685 | A | * | 7/1964 | Watts .............................. 285/93 |
| 3,379,460 | A | | 4/1968 | Allyn |
| 3,628,812 | A | | 12/1971 | Larraide et al. |
| 3,889,840 | A | * | 6/1975 | Price .............................. 220/664 |
| 3,951,301 | A | * | 4/1976 | Meginnis ....................... 220/328 |
| 4,102,473 | A | * | 7/1978 | Draxler .......................... 220/319 |
| 4,253,583 | A | * | 3/1981 | Lynch ............................ 220/319 |
| 4,311,492 | A | * | 1/1982 | Eltvedt ............................ 96/416 |
| 4,512,369 | A | | 4/1985 | Takahashi |
| 4,695,079 | A | | 9/1987 | Weinhold |
| 4,809,862 | A | * | 3/1989 | Canty ............................. 220/663 |
| 4,830,216 | A | * | 5/1989 | Miyauchi ....................... 220/377 |
| 4,951,851 | A | * | 8/1990 | King et al. ..................... 222/591 |

(Continued)

*Primary Examiner* — Terrell McKinnon
*Assistant Examiner* — Christopher Garft
(74) *Attorney, Agent, or Firm* — McDonald Hopkins LLC

(57) ABSTRACT

An embodiment of the invention provides for an assembly for securing equipment to a tank. The assembly comprises a base, a split ring, and a clamp. The base comprises a tank engagement portion, a base aperture, a lip positioned along a perimeter of the base aperture, and a first mating surface. The split ring is arranged to be at least partially positionable within the base. The split ring comprises a split ring aperture and a second mating surface in contact with the first mating surface when the split ring is partially positioned within the base. The clamp is positionable to hold the first mating surface in contact with the second mating surface. The clamp comprises a clamp aperture, a first contact surface, and a second contact surface. When the clamp is positioned to hold the mating surfaces in contact, the first contact surface contacts the base, and the second contact surface contacts the split ring.

18 Claims, 9 Drawing Sheets

U.S. PATENT DOCUMENTS

| | | |
|---|---|---|
| 5,137,162 A | 8/1992 | Fritz |
| 5,141,125 A * | 8/1992 | Canty et al. .................. 220/820 |
| 5,582,318 A * | 12/1996 | Dietrich ....................... 220/319 |
| 5,584,411 A | 12/1996 | Channell et al. |
| 5,645,301 A | 7/1997 | Kingsford et al. |
| 5,829,106 A * | 11/1998 | Dams et al. .................... 24/270 |
| 6,109,590 A | 8/2000 | Koerner |
| 6,832,762 B2 | 12/2004 | Jost |
| 7,134,315 B1 | 11/2006 | Stigler et al. |
| 2002/0140222 A1 * | 10/2002 | Pampinella ..................... 285/93 |
| 2004/0134260 A1 * | 7/2004 | Pampinella et al. ........... 73/49.1 |
| 2004/0195188 A1 * | 10/2004 | Holt et al. ...................... 210/748 |
| 2004/0237632 A1 * | 12/2004 | Van Keeken ..................... 73/46 |
| 2005/0200128 A1 * | 9/2005 | Bongiorno ...................... 285/364 |
| 2005/0236778 A1 * | 10/2005 | Jupp ............................ 277/312 |
| 2006/0254585 A1 * | 11/2006 | Ishizeki et al. ........... 128/203.21 |
| 2006/0270490 A1 * | 11/2006 | Lo ................................. 473/345 |

\* cited by examiner

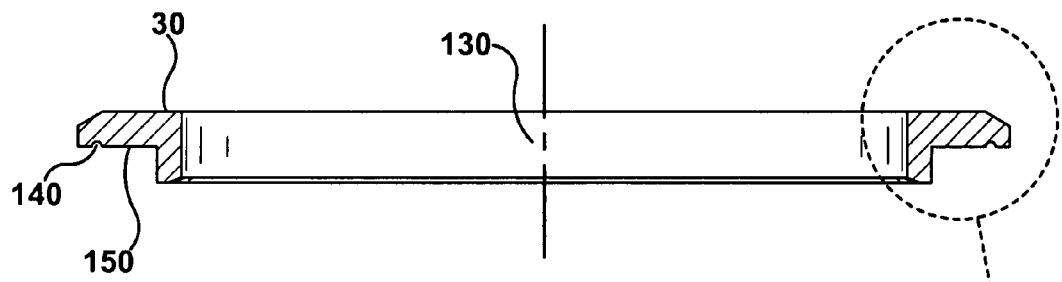
Figure 12
Figure 12A
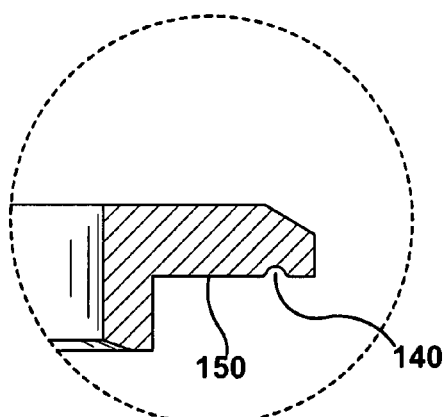
Figure 12A
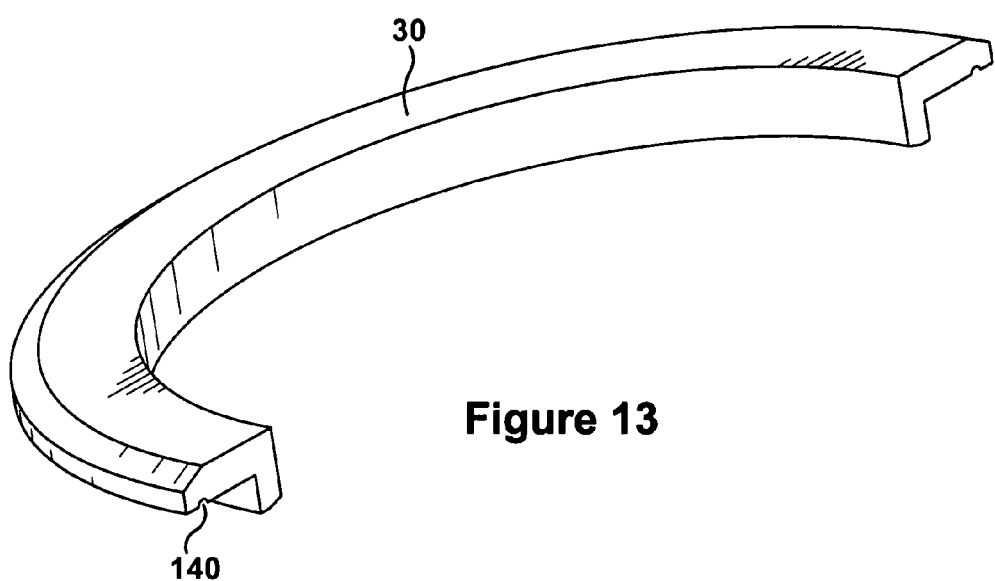
Figure 13

RETAINING SPLIT RING WITH CLAMP

CROSS-REFERENCE TO RELATED APPLICATIONS

This non-provisional patent application claims the benefit of U.S. Provisional Patent Application No. 60/813,294 to Dale A. Sandy and entitled "RETAINING SPLIT RING WITH CLAMP," filed Jun. 13, 2006, which is hereby incorporated in its entirety.

FIELD OF THE INVENTION

The present invention is generally related to assemblies that include a retaining split ring and, more particularly, to assemblies that include a clamp to retain a retaining split ring in place.

BACKGROUND OF THE INVENTION

Tanks often require that additional equipment, such as sensors and valves, be connected or attached to the tank to help operate the tank or to monitor the activity within the tank. In one example, sterile sealed tanks, such as aseptic tanks, often require sensors, valves, sampling systems, and the like to be connected to the tank to operate and monitor the tank. A connector device is typically required to connect such equipment to tanks. One such connection device is a retaining split ring.

A retaining split ring may utilize a base and a ring. In examples of known retaining split rings, studs and nuts hold the base and ring together. These studs and nuts can be difficult to attach, can become loosened during operation of the tank, and can be easily lost. Additionally, these retaining split rings have a large profile, and it can be difficult to determine if they are properly attached.

Accordingly, there is a need for a retaining split ring that easily attaches the base and ring together, that creates a good seal, does not become loosened during its use, and is not easily lost.

Additional information will be set forth in the description which follows and, in part, will be obvious from the description or may be learned by practice of the invention.

SUMMARY OF INVENTION

An embodiment of the invention provides for an assembly for securing equipment to a tank. The assembly comprises a base, a split ring, and a clamp. The base comprises a tank engagement portion, a base aperture, a lip, and a first mating surface. The lip is positioned along a perimeter of the base aperture. The split ring is arranged to be at least partially positionable within the base. The split ring comprises a split ring aperture and a second mating surface. The second mating surface is in contact with the first mating surface when the split ring is partially positioned within the base. The clamp is positionable to hold the first mating surface in contact with the second mating surface. The clamp comprises a clamp aperture, a first contact surface, and a second contact surface. When the clamp is positioned to hold the first mating surface in contact with the second mating surface, the first contact surface is in contact with the base, and the second contact surface is in contact with the split ring.

DESCRIPTION OF THE DRAWINGS

Operation of the invention may be better understood by reference to the following detailed description taken in connection with the following illustrations, wherein:

FIG. 12 is a cross-sectional view of a split ring for use with the retaining split ring with clamp of FIG. 1;

FIG. 12A is a cross-sectional view of detail 12A of FIG. 12;

FIG. 13 is a perspective view of a split ring for use with the retaining split ring with clamp of FIG. 1;

DETAILED DESCRIPTION

Figure 1:
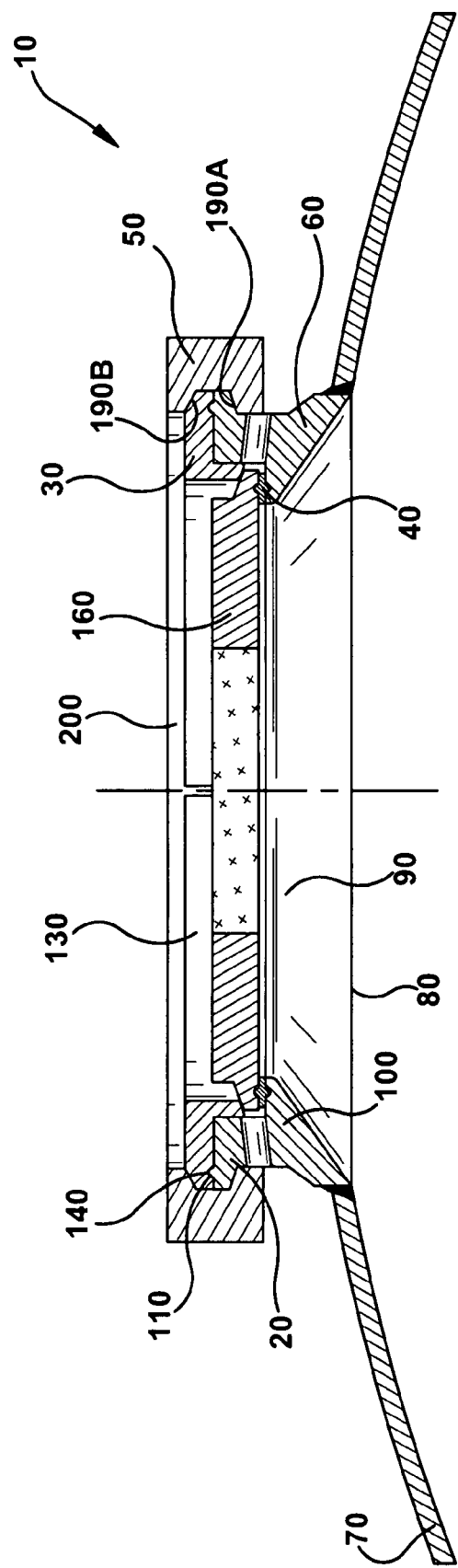
FIG. 1 is a cross-sectional view of an embodiment of a retaining split ring with clamp.

While the present invention is described with reference to the embodiments set forth herein, it should be clear that the present invention should not be limited to such embodiments. Therefore, the description of the embodiments herein is illustrative of the present invention and should not limit the scope of the invention as claimed.

Reference will now be made in detail to the embodiments of retaining split ring assemblies as shown in the accompanying figures. FIGS. 1 through 5 illustrate an exemplary retaining split ring assembly 10. The retaining split ring assembly 10 as shown in FIGS. 1 through 5 comprises a connection base 20, a split ring 30, a gasket 40, and a clamp 50. The retaining split ring assembly 10 allows fewer pieces to be used than previously required. Furthermore, the retaining split ring assembly 10 provides a low profile connection. This allows more equipment and other such items to be attached to the vessel, pipe, or tank and provides more overall room than previous designs.

Figure 2:
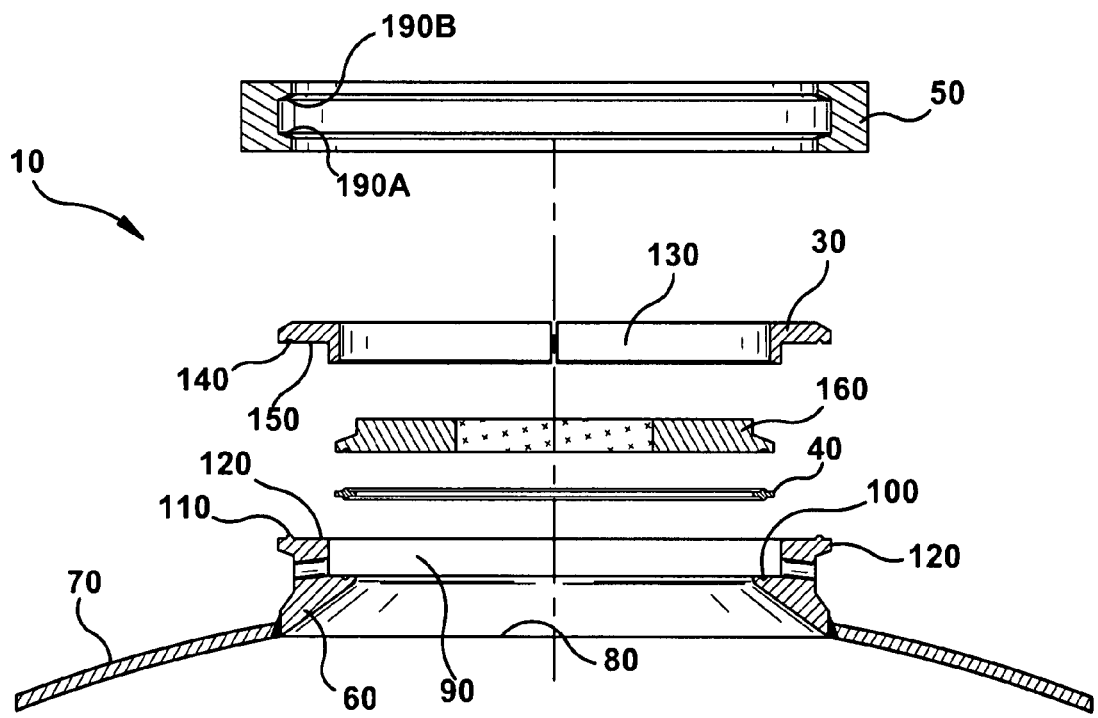
FIG. 2 is an exploded cross-sectional view of the retaining spilt ring with clamp of FIG. 1.
Figure 3:
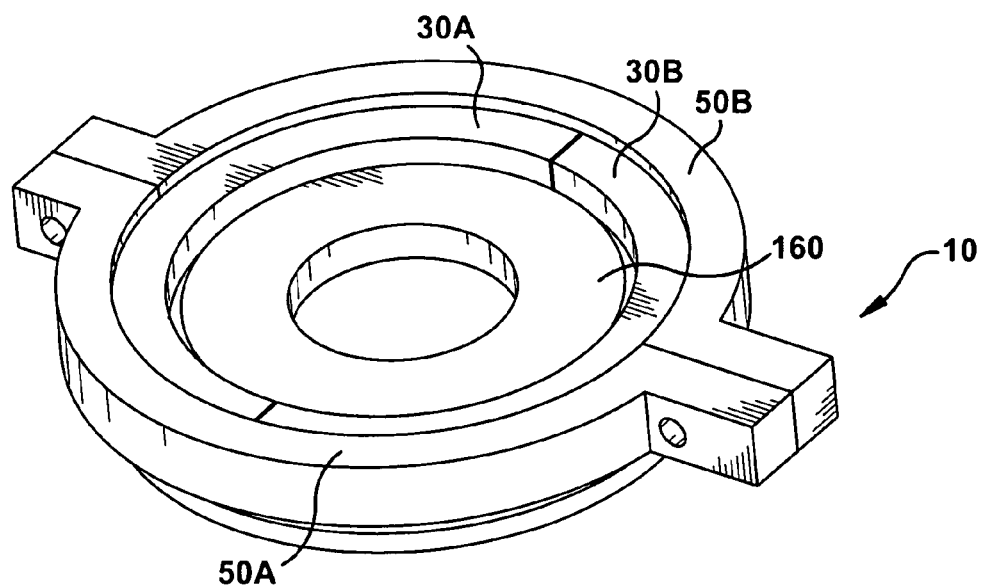
FIG. 3 is a perspective view of the retaining split ring with clamp of FIG. 1.
Figure 4:
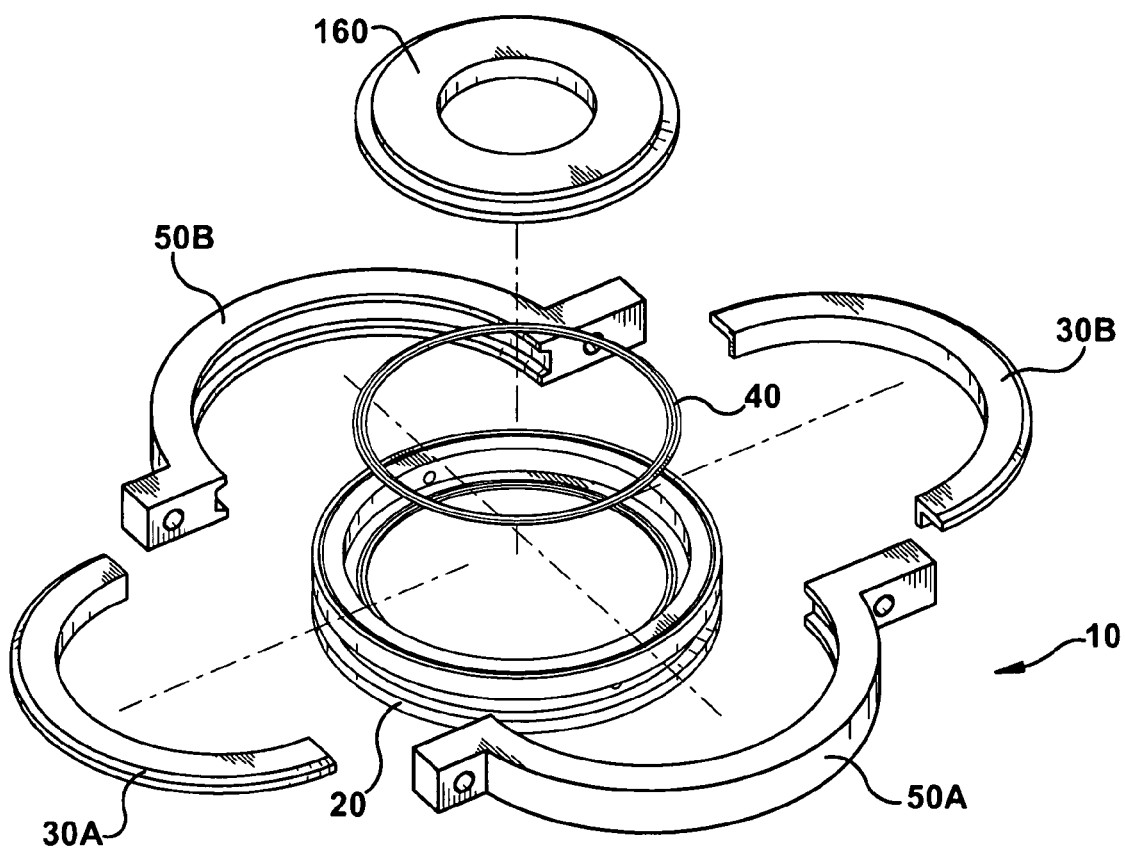
FIG. 4 is a perspective exploded view of the retaining split ring with clamp of FIG. 1.

As shown in FIGS. 1 and 2, the base 20 includes a lower portion 60 that is arranged to engage an outer surface of a tank 70. The engagement of this tank engagement portion 60 of the base 20 with the tank 70 forms a seal between the tank 70 and the base 20. Once engaged with the tank 70, the tank engagement portion 60 forms a smaller footprint than prior art devices, which allows more room for additional fittings on the tank 70. In an embodiment, the tank engagement portion 60 is arranged as a flange that may be welded to the outer surface of the tank 70 at the location of an aperture 80 in the surface of the tank 70. When the connection base 20 is arranged such that the tank engagement portion 60 engages the tank 70, the remaining components of the retaining split ring assembly 10 may be assembled with the base 20 to engage the assembly 10 with the tank 70. In such an arrangement, the assembly 10 may have direct access to the interior of the tank 70 through the aperture 80 in the tank 70. Thus, any valve, sensor, or similar equipment retained in the assembly 10 will also have direct access to the interior of the tank 70.

Figure 6:
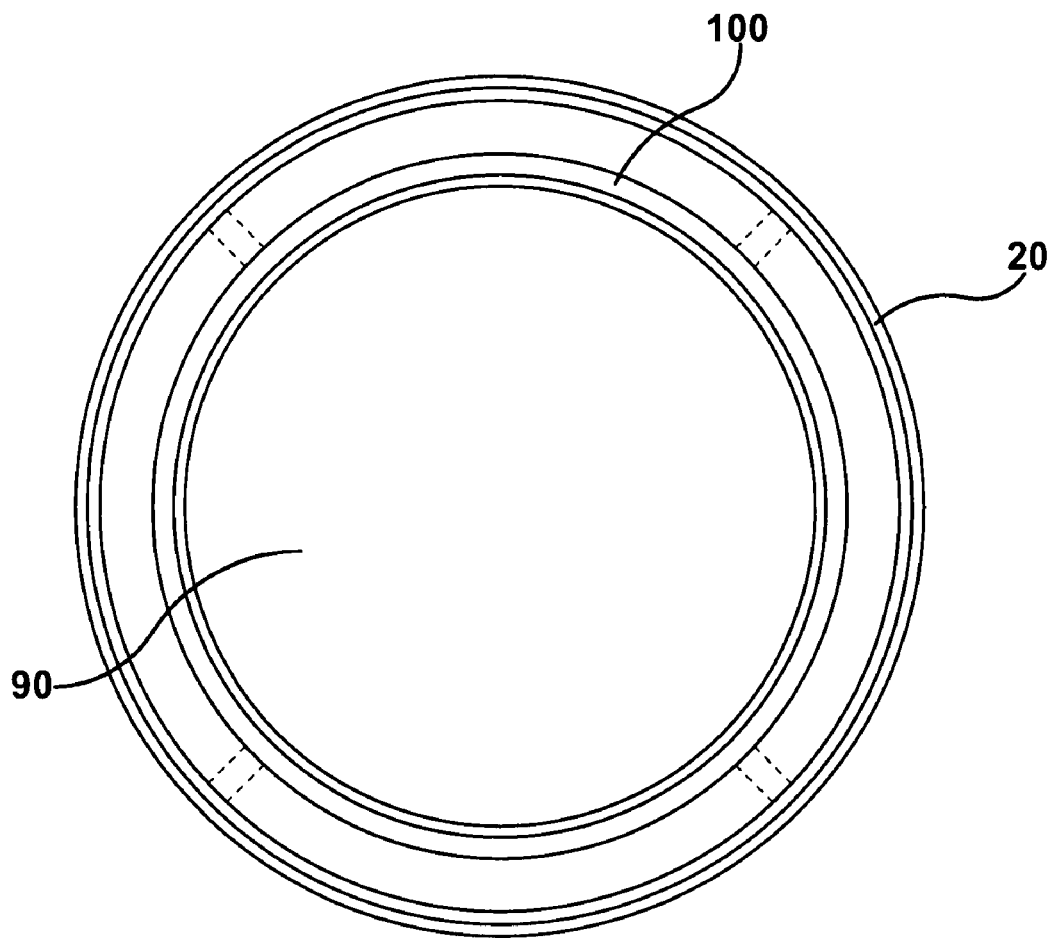
FIG. 6 is a top view of a base for use with the retaining split ring with clamp of FIG. 1.
Figure 7:
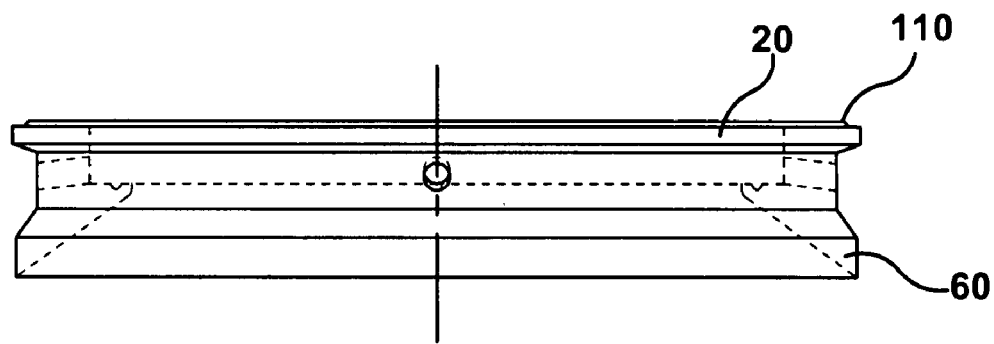
FIG. 7 is a side view of a base for use with the retaining split ring with clamp of FIG. 1.
Figure 8:
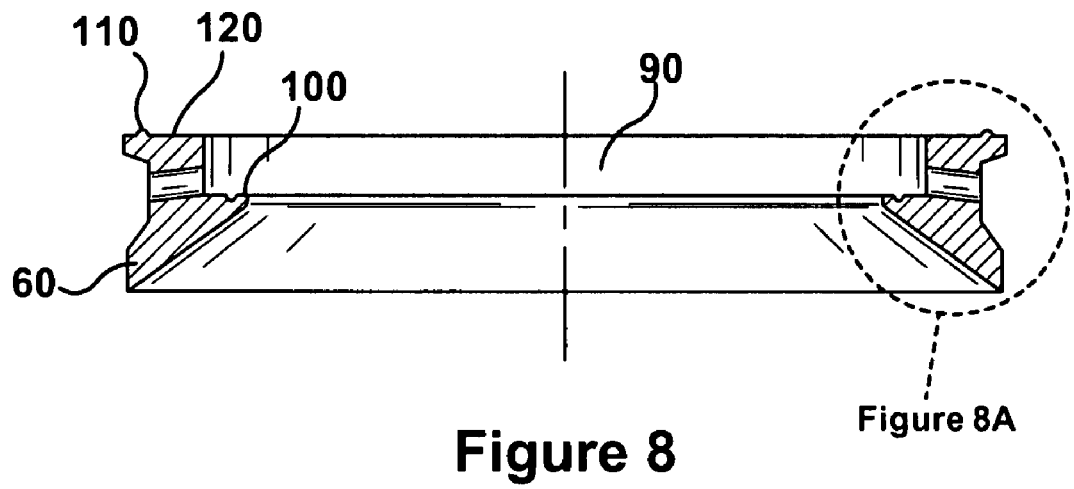
FIG. 8 is a cross-sectional view of a base for use with the retaining split ring with clamp of FIG. 1.
Figure 8A:
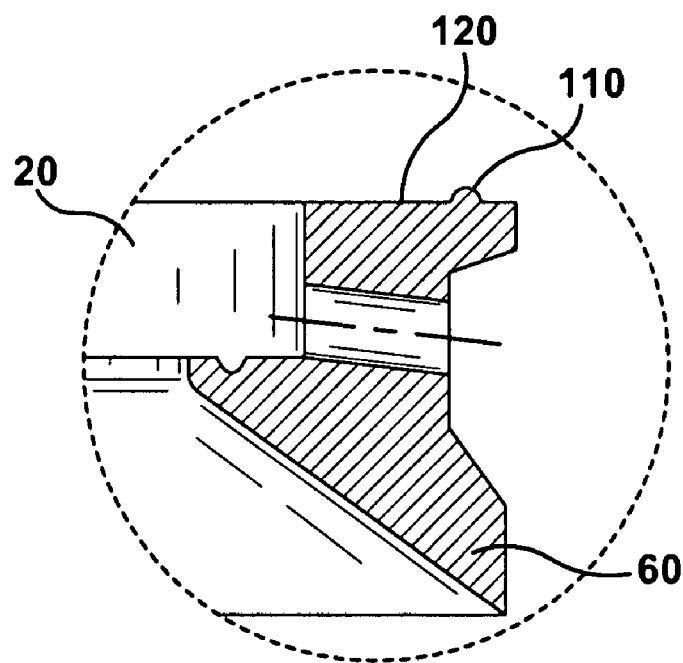
FIG. 8A is a cross-sectional view of detail 8A of FIG. 8.
Figure 9:
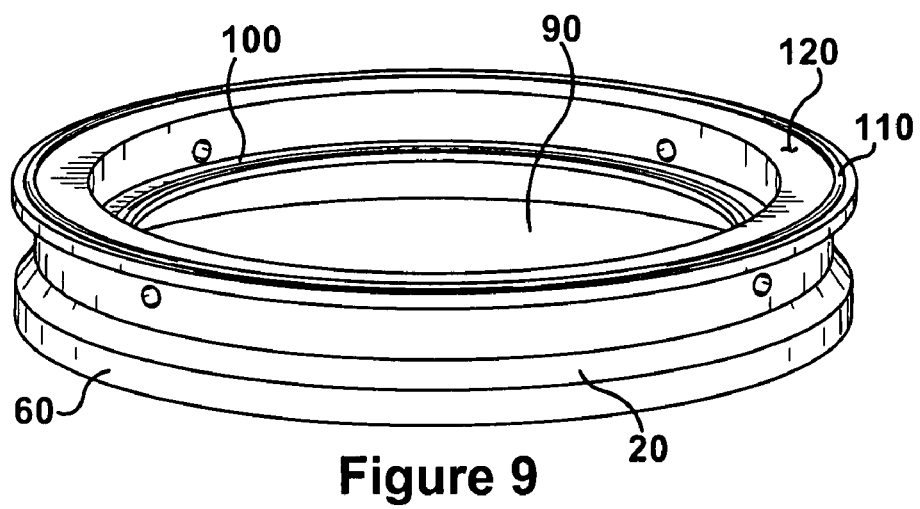
FIG. 9 perspective view of a base for use with the retaining split ring with clamp of FIG. 1.
Figure 10:
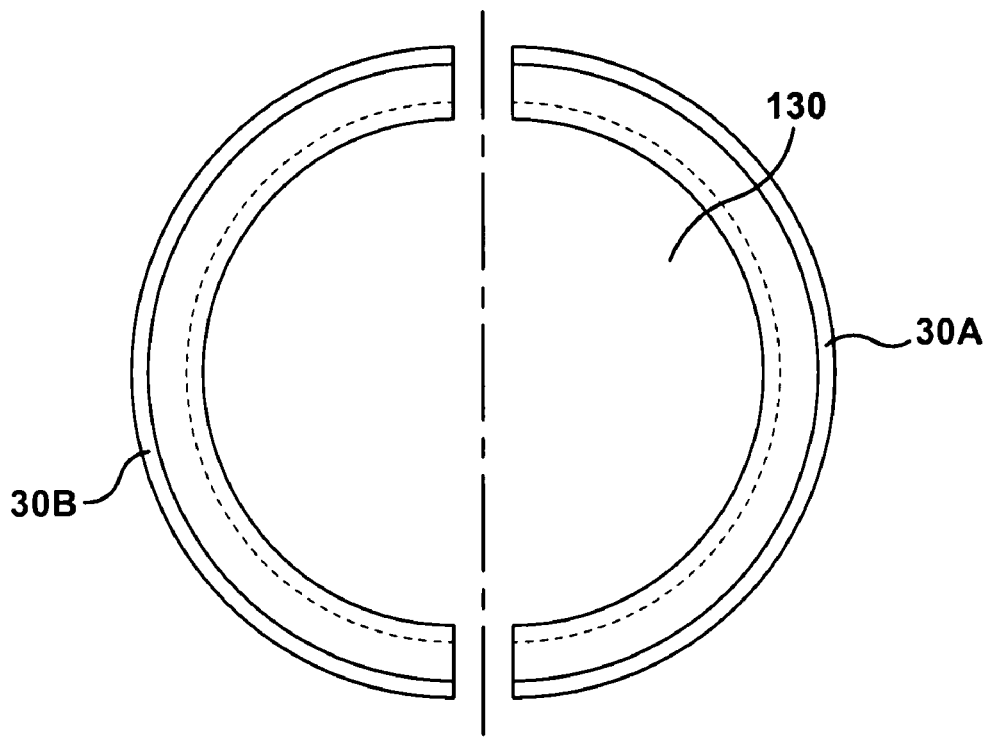
FIG. 10 is a top view of a split ring for use with the retaining split ring with clamp of FIG. 1.
Figure 11:
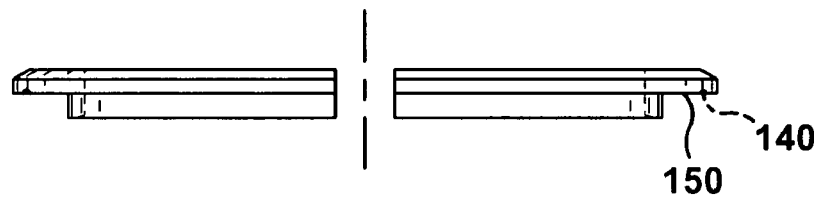
FIG. 11 is a side view of a split ring for use with the retaining split ring with clamp of FIG. 1.
Figure 14:
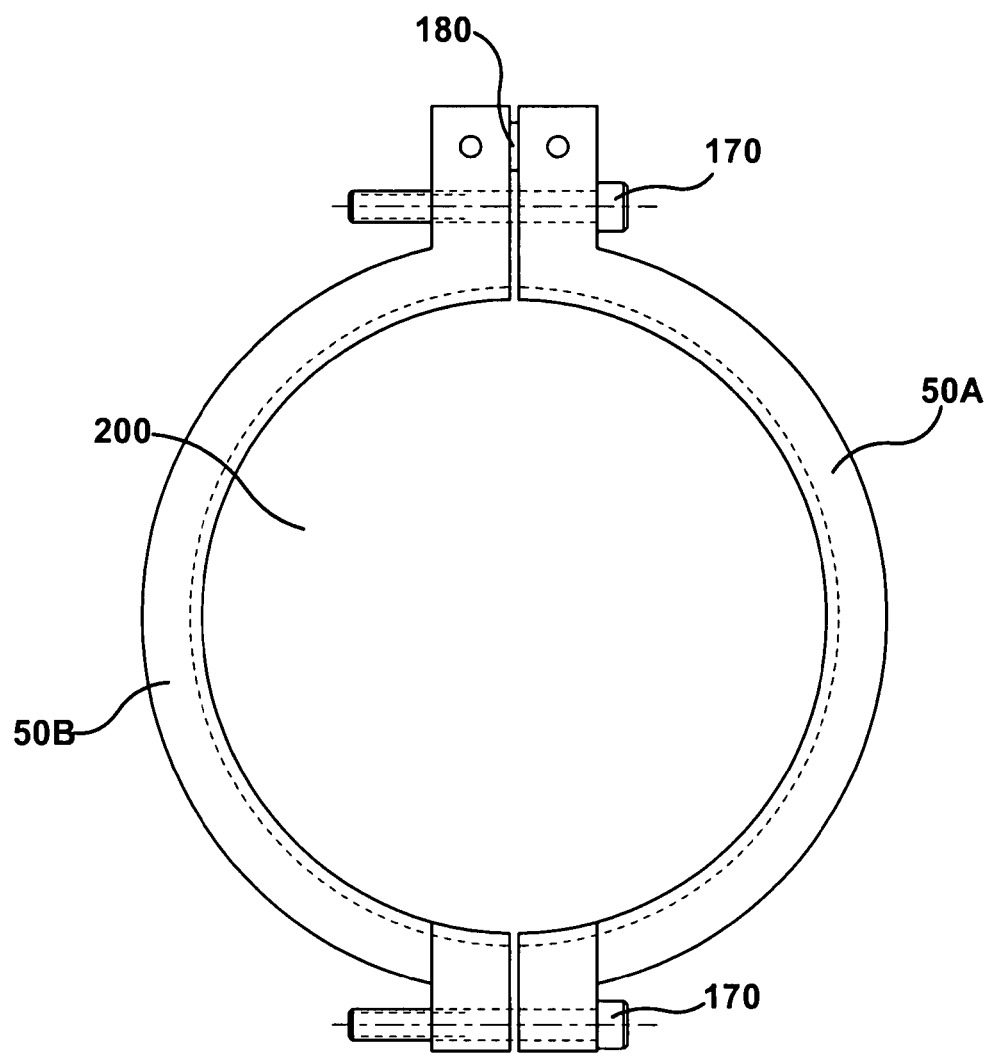
FIG. 14 is a top view of a clamp for use with the retaining split ring with clamp of FIG. 1.
Figure 15:
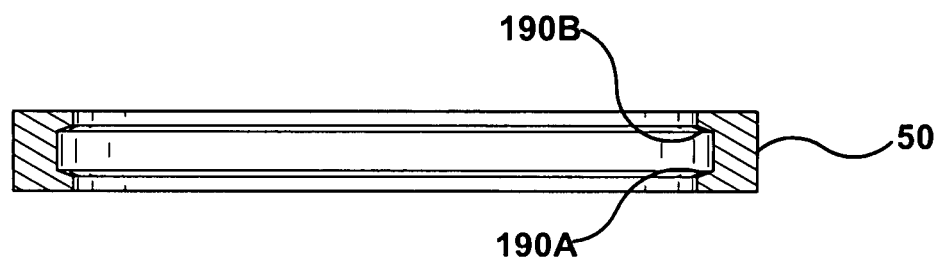
FIG. 15 is a side view of a clamp for use with the retaining split ring with clamp of FIG. 1.
Figure 16:
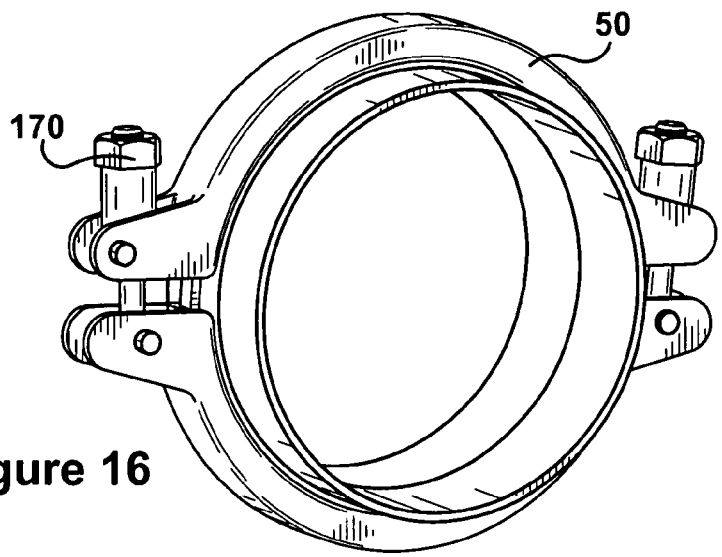
FIG. 16 is a perspective view of a retaining split ring with clamp.
Figure 17:
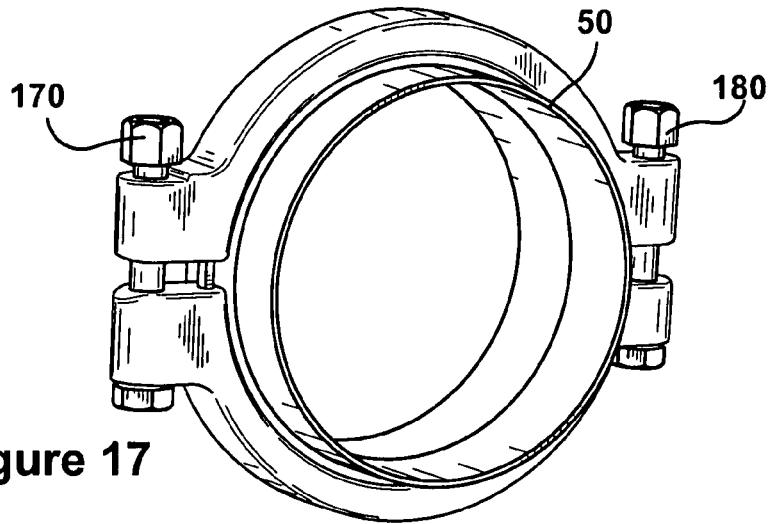
FIG. 17 is a perspective view of a retaining ring with clamp.
Figure 18:
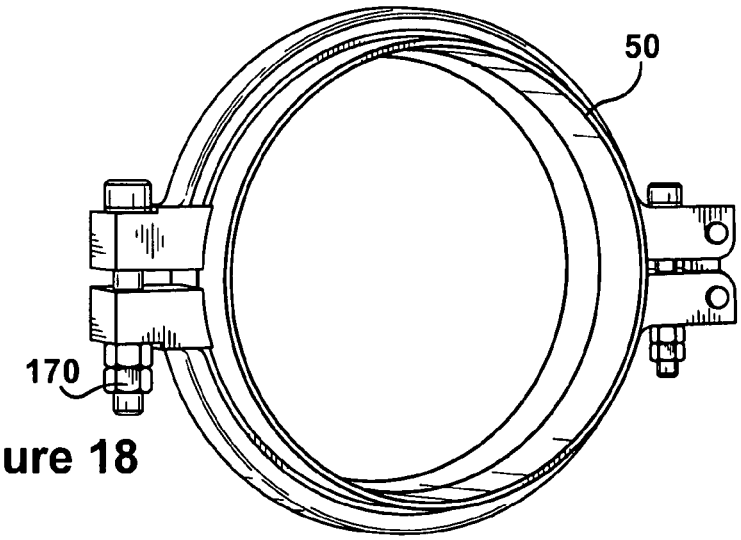
FIG. 18 is a perspective view of a retaining ring with clamp.

FIGS. 6 through 9 further illustrate the connection base 20. As shown in the figures, the connection base 20 includes a base aperture 90 and a lip or shelf 100 positioned within the aperture 90. In an embodiment, the lip 100 is annular and positioned along the perimeter of the base aperture 90 (as best seen in FIGS. 6 and 9). It will be understood by those skilled in the art that the lip 100 may have the same general shape as the base aperture 90 as is shown in the exemplary embodiment of the figures, i.e., both the base aperture 90 and lip 100 are annular. It will also be understood by those skilled on the art that the lip 100 may have a shape that is different than the shape of the base aperture 90. In one example, if the base aperture 90 is annular, the lip 100 may be generally square shaped or rectangular in shape.

In an embodiment, the base aperture 90 is arranged to align with the aperture 80 of the tank 70 when the base 20 is engaged with the tank 70. As will be further described herein, the lip 100 is arranged to receive a sensor, valve, sampling system, or other such equipment that assists in operating or monitoring the tank 70. As is best seen in FIG. 9, the base 20 may include an annular raised ridge or protrusion 110 along a surface 120 of the base 20 opposite the tank engagement portion 60 of the base 20. Although the protrusion 110 is shown and described as annular, it will be readily understood that a protrusion may be any shape or size.

FIGS. 10 through 13 further illustrate the split ring 30. As shown in the figures, the split ring 30 may be comprised of a pair of ring halves 30A and 30B. The ring halves 30A and 30B are mirror images of each other and are positioned adjacent to each other to form a full ring 30. When the ring halves 30A and 30B are positioned to form a ring 30, a ring aperture 130 is formed in the ring 30. As best seen in FIGS. 12 and 13, the ring 30 includes a generally L-shaped cross-section. The ring 30 also includes an alignment groove 140 along a lower surface 150 of the ring 30. In one embodiment, the groove 140 is annular and positioned along the lower surface 150. Although the alignment groove 140 is shown and described as annular, it will be understood that an alignment groove may be any shape or size.

As is shown in FIGS. 1 through 5, the split ring 30 may be shaped and sized to engage the connection base 20. The ring 30 may be arranged such that the ring 30 is at least partially positionable within the base 20. The ring 30 may be positioned such that a portion of the ring 30 rests on the lip 100 of the base 20. In such an arrangement, the aperture 130 of the ring 30 generally aligns with the aperture 90 of the base 20 and the aperture 80 of the tank 70. The ring 30 may also be positioned such that the lower surface 150 of the ring 30 mates with a surface 120 of the base 20. In such an arrangement, these mating surfaces 120 and 150 engage each other such that the split ring 30 is partially positioned within the base 20 and the ring aperture 130 generally aligns with the base aperture 90 and the tank aperture 80.

The split ring 30 may also be positioned such that the alignment groove 140 of the ring 30 and the protrusion 110 of the base 20 mate to further promote alignment between the base 20 and the ring 30. Such mating also enhances the quality of the seal between the mating components 20 and 30. A gasket 40 may be placed between the base 20 and the split ring 30. Such placement of a gasket 40 may reduce or prevent leakage of liquids or other fluids between the connection base 20 and the split ring 30 once the assembly 10 is assembled.

As best seen in FIG. 1, a sensor, valve, or the like 160 is positioned within the aperture 130 of the ring 30 and secured between the ring 30 and the base 20 during assembly of the retaining split ring assembly 10. Such positioning of a sensor or valve 160 exposes the sensor or valve 160 to the interior of the tank 70 to facilitate a measurement of an internal condition of the tank, the operation of the tank, etc. In one embodiment, the gasket is positioned between a sensor 160 and the lip 100 of the base 20. The ring 30 is positioned on top of the sensor 160 to hold the sensor 160 within the assembly 10.

The base aperture 90, the lip 100, and the ring aperture 130 may be designed and manufactured in a variety of sizes and shapes to accommodate a specific tank or a specific sensor, valve, sampling system, etc. to be connected with the tank. Additionally, the base aperture 90, the lip 100, and the ring aperture 130 may be designed and manufactured to accommodate a metal cover that can be selectively removed to facilitate the connection of separate piece of equipment, e.g., a sensor, valve, sampling system, etc. In one embodiment, the base aperture 90, the lip 100, and the ring aperture 130 are designed and manufactured such that standard sight glasses, ferrules, and the like may be positioned and held within the assembly 10.

Figure 5:
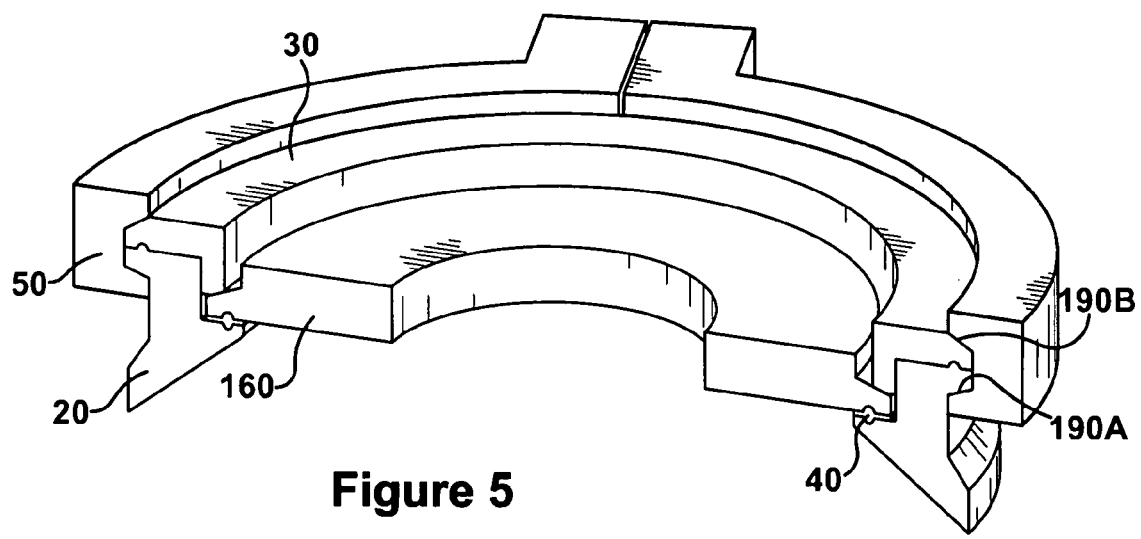
FIG. 5 is a perspective cross-sectional view of the retaining split ring with clamp of FIG. 1.

FIGS. 14 through 18 further illustrate the clamp 50. The clamp 50 may be comprised of a pair of clamp halves 50A and 50B. In one embodiment, the clamp halves 50A and 50B are semi-annular members. The clamp halves 50A and 50B may be secured together with a pair of fasteners 170. Such an arrangement forms a clamp aperture 200 in the assembled clamp 50. As best seen in FIGS. 1 and 5, the clamp 50 may be positioned to surround the perimeter of the base 20 and split ring 30. In such an arrangement, the clamp aperture 200 may align with the ring aperture 130, the base aperture 90, and the tank aperture 80.

The clamp 50 is designed to provide sufficient force to compress the ring 30 and base 20 together such that a sensor or valve 160 is securely held within the retaining split ring assembly 10. In addition, the compression force of the clamp 50 enhances the seal of the assembly 10 by placing a compressive force on the gasket 40 and forcing the protrusion 110 of the base 20 into the groove 140 of the split ring 30. In an embodiment, clamp 50 may include only one fastener 170 and a hinge 180 to facilitate the attachment and removal of the clamp 50.

As is best seen in FIGS. 1 and 5, internal contact surfaces 190A and 190B of the clamp 50 are positioned at angles. Upon assembly of the retaining slit ring assembly 10, a first surface 190A in placed in contact with the base 20 and a second surface 190B is placed in contact with the split ring 30. As the clamp 50 is tightened and the clamp halves 50A and 50B are drawn toward one another, it will be appreciated that the angled contact surfaces 190A and 190B of the clamp 50 will place a compressive force on the base 20 and the split ring 30 that increases as the clamp 50 is tightened.

In an embodiment, the clamp 50 may be made of stainless steel. The stainless steel can be investment casting to provide high quality and a precision fit. In other embodiments, the clamp 50 may be any variety of clamp such as, for example, an SH style clamp (shown in FIG. 16), an SSH clamp (shown in FIG. 17), and an ASME clamp (shown in FIG. 18).

The fasteners 170 may be any type of fastener. In an embodiment, the fasteners may be wing nuts, such as the ergonomic standard, the ergonomic dome. In other examples, the fasteners may be hex nuts, such as dome nuts, lock nuts, standard nuts, and spring loaded nuts. Moreover, a fastener may include a safety release that prevents the clamp from fully opening before the nut reaches a certain predetermined point. The clamp 50 as shown removes ambiguity regarding whether the retaining split ring assembly 10 is properly attached and sealed with the vessel, pipe, or tank. Previous designs allow for ambiguity regarding whether one or more the nuts are properly tightened. The clamps 50 eliminate this ambiguity.

The retaining split ring assembly 10 can be attached directly to a surface of a tank, to a pipe that runs from the tank, or to any other device or mechanism that extends from the tank. As aforementioned, the connection base 20 may be welded to the surface of the vessel, pipe, or tank section. The split ring 30 may be of any size. For example, sizes may range from ⅜" to 10". Accordingly, the connection base 20 may be of any size, as well as permitting any standard equipment to be attached thereto and providing flexibility.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, I claim:

1. An assembly for securing equipment to a tank, the assembly comprising:
    a base comprising:
        a tank engagement portion connected to a sidewall of the tank at an opening in the tank;
        a base aperture;
        an lip positioned along a perimeter of the base aperture; and
        a first mating surface;
    a split ring comprising a first ring portion and a second ring portion defining a split ring aperture, the split ring including a second mating surface in contact with the first mating surface to position the split ring at least partially within the base such that the split ring is nested within the base aperture and forms a gap between the split ring and the lip;
    a device positioned within the gap and arranged approximately in the confines of the sidewall of the tank and secured between the split ring and the lip, wherein the device is configured to interface with the opening in the tank; and
    a clamp positionable to hold the first mating surface in contact with the second mating surface, the clamp comprising:
        a clamp aperture;
        a first contact surface in contact with the base when the clamp is positioned to hold the first mating surface in contact with the second mating surface; and
        a second contact surface in contact with the split ring when the clamp is positioned to hold the first mating surface in contact with the second mating surface.

2. The assembly of claim 1 wherein the first contact surface of the clamp is angled.

3. The assembly of claim 1 wherein the second contact surface of the clamp is angled.

4. The assembly of claim 1 wherein the lip is annular.

5. The assembly of claim 1 further comprising a gasket.

6. The assembly of claim 5 wherein the gasket is positioned in contact with the lip when the split ring is positioned partially within the base.

7. The assembly of claim 1 wherein the device is a sensor.

8. The assembly of claim 1 wherein the device is a valve.

9. The assembly of claim 1 wherein the base further comprises an annular protrusion protruding from the first mating surface.

10. The assembly of claim 9 wherein the split ring further comprises an annular groove in the second mating surface that mates with the protrusion when the first mating surface is in contact with the second mating surface.

11. The assembly of claim 1 wherein the split ring further comprises an annular protrusion protruding from the second mating surface.

12. The assembly of claim 11 wherein the base further comprises an annular groove in the first mating surface that mates with the protrusion when the first mating surface is in contact with the second mating surface.

13. The assembly of claim 1 wherein the tank engagement portion is a welding flange.

14. The assembly of claim 1 wherein the clamp further comprises a first semi-annular member and a second semi-annular member positioned adjacent to the first semi-annular member to form the clamp.

15. The assembly of claim 14 wherein the clamp further comprise a first fastener to secure the first semi-annular member to the second semi-annular member to form the clamp.

16. The assembly of claim 15 wherein the clamp further comprises a second fastener to secure the first semi-annular member to the second semi-annular member to form the clamp.

17. The assembly of claim 15 wherein the clamp further comprises a hinge member to rotatably secure the first semi-annular member to the second semi-annular member to form the clamp.

18. The assembly of claim 1 wherein the device is sight glasses.

* * * * *

UNITED STATES PATENT AND TRADEMARK OFFICE
CERTIFICATE OF CORRECTION

| | | |
|---|---|---|
| PATENT NO. | : 8,262,042 B2 | Page 1 of 1 |
| APPLICATION NO. | : 11/818038 | |
| DATED | : September 11, 2012 | |
| INVENTOR(S) | : Dale A. Sandy | |

It is certified that error appears in the above-identified patent and that said Letters Patent is hereby corrected as shown below:

In the Claims

Column 5, line 45, delete "in" and insert -- within --

Signed and Sealed this
Ninth Day of September, 2014

Michelle K. Lee
*Deputy Director of the United States Patent and Trademark Office*